April 3, 1962   R. T. HEADRICK   3,028,010
ERECTOR TYPE AIR TRANSPORTABLE FUELING SYSTEM
Filed Aug. 13, 1957   3 Sheets-Sheet 1

INVENTOR.
RICHARD T. HEADRICK
BY Albert L. Jeffers
ATTORNEY

April 3, 1962 R. T. HEADRICK 3,028,010
ERECTOR TYPE AIR TRANSPORTABLE FUELING SYSTEM
Filed Aug. 13, 1957 3 Sheets-Sheet 2

INVENTOR.
RICHARD T. HEADRICK
BY
Albert L. Jeffers
ATTORNEY

April 3, 1962 R. T. HEADRICK 3,028,010
ERECTOR TYPE AIR TRANSPORTABLE FUELING SYSTEM
Filed Aug. 13, 1957 3 Sheets-Sheet 3

INVENTOR.
RICHARD T. HEADRICK
BY
Albert L. Jeffers
ATTORNEY

United States Patent Office 3,028,010
Patented Apr. 3, 1962

3,028,010
ERECTOR TYPE AIR TRANSPORTABLE FUELING SYSTEM
Richard T. Headrick, Fort Wayne, Ind., assignor to Bowser, Inc., Fort Wayne, Ind., a corporation of Indiana
Filed Aug. 13, 1957, Ser. No. 677,935
7 Claims. (Cl. 210—172)

This invention relates generally to means for a portable erector set type of fueling system and more particularly is directed to a fueling system embodying improved principles of design and construction so that the entire system may be carried in one aircraft such as a C–124 along with all spares, tools and personnel necessary for erection, operation, servicing or dis-assembly.

The fueling system is particularly designed and constructed so that it may be erected in a reasonable period of time by a comparatively small crew with a minimum of tools. The erector type concept is an easily operated and quickly installed fueling system designed to contain a sufficient quantity of fuel to balance the logistic supply lag and still be able to service aircraft on a rapid turn around program in a condition of perimeter warfare where normal sources of supply are not yet applicable without sacrificing the strictest concept within the state of the art of being able to deliver clean dry fuel to the aircraft.

With the foregoing in mind, one of the principal objects of the invention is to provide a fueling system comprising, among other things a portable servicing vehicle with a number of sub-assemblies or units disposed thereon, or associated therewith, which successively conditions or treats aviation gasolines or jet fuels circulating or passing therethrough. More particularly in this respect, the vehicle includes a tank having filter/water separator, a three-way valve, line strainer, a pressure regulator connected in series on the inlet line, and a sump disposed below the tank whereby the water removed from the fuels can be drained away or removed from the tank in any manner desired. The outlet line is provided with a meter, surge suppressor, gate valve and fueling nozzles for delivery of the fuel to the aircraft.

An important object of the invention is to provide an adapter means to receive fuel from a variety of sources such as tanker airplanes, ship tanker, storage drums, truck tankers and railroad tankers and transmit the fuel to a collapsible or pillow tank farm storage area.

A significant object of the invention is to provide a fueling system which will pressure regulate, filter/water separate and dehydrate jet fuel or aviation gasoline in the process of delivering the jet fuel or aviation gasoline to the flight line whereby center point nozzles or over the wing nozzles may be used simultaneously for servicing an aircraft at a substantially high flow rate.

A specific object of the invention is to provide means for flushing the system or returning the jet fuel or aviation gasoline without the waste of fuel by recirculating the initial fuel supply through the filters and back into the storage tanks in such a manner that every single component, with the exception of the nozzles themselves, will have been completely flushed prior to the fueling of an aircraft.

Another object of the invention is to provide a fueling system which is reasonably non-radar reflective and resistant to damage in strafing or bombing attacks.

A further object of the invention is to provide an erector type of fueling system which is capable of operating under a wide variety of conditions such as increased or decreased storage capacity, inter-connection with other systems; variations in delivery equipment and flexible and non-critical installation requirements easily adapted to varying terrain contours and climatic conditions.

Many other objects and advantages of the invention will become apparent after the description hereinafter set forth is considered in conjunction with the drawings annexed hereto.

Figure 1:
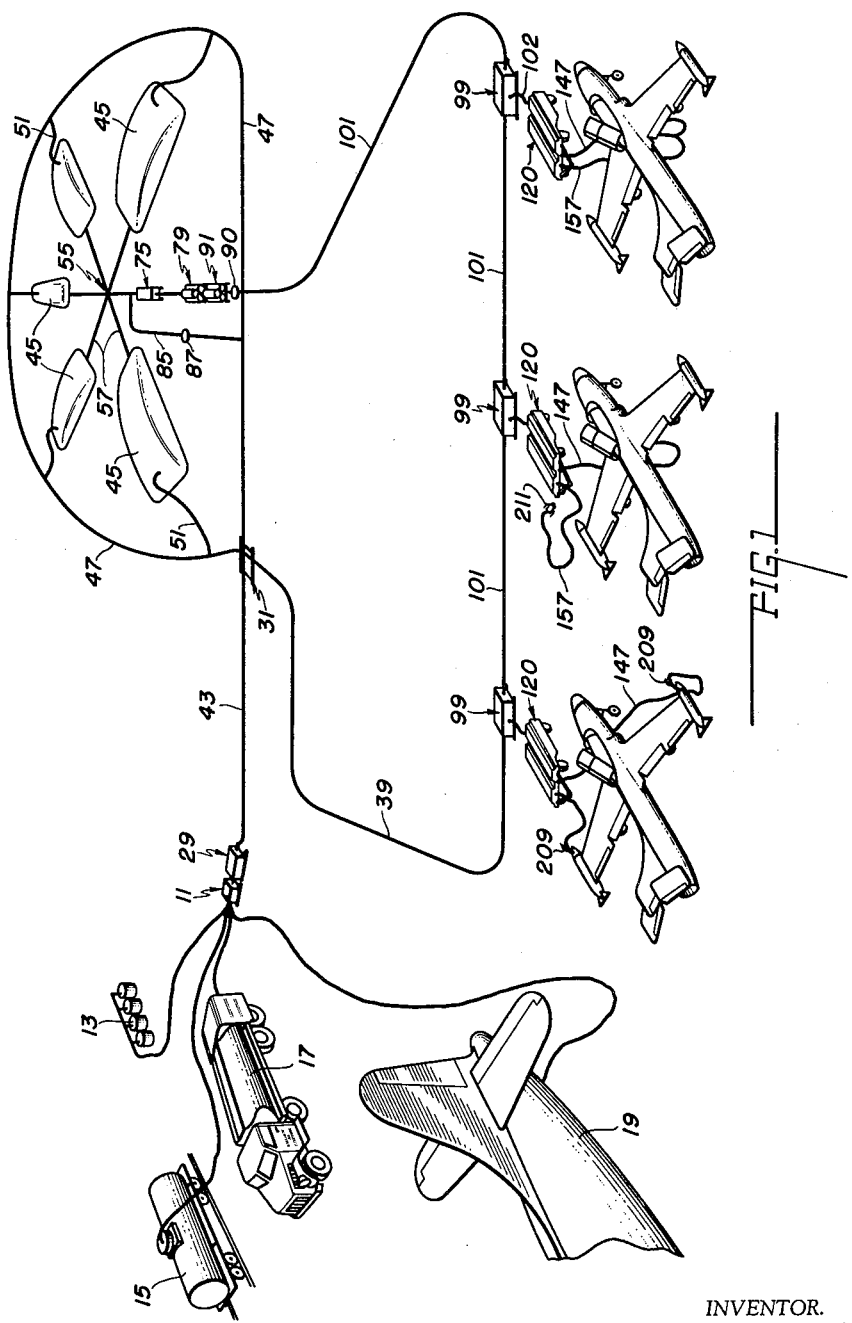
FIGURE 1 is a diagrammatic view depicting the novel fueling system in its preferred form.

In referring to the drawings, detail views of the elements and components have been omitted because they have in one application or another become standard to the industry.

Figure 2:
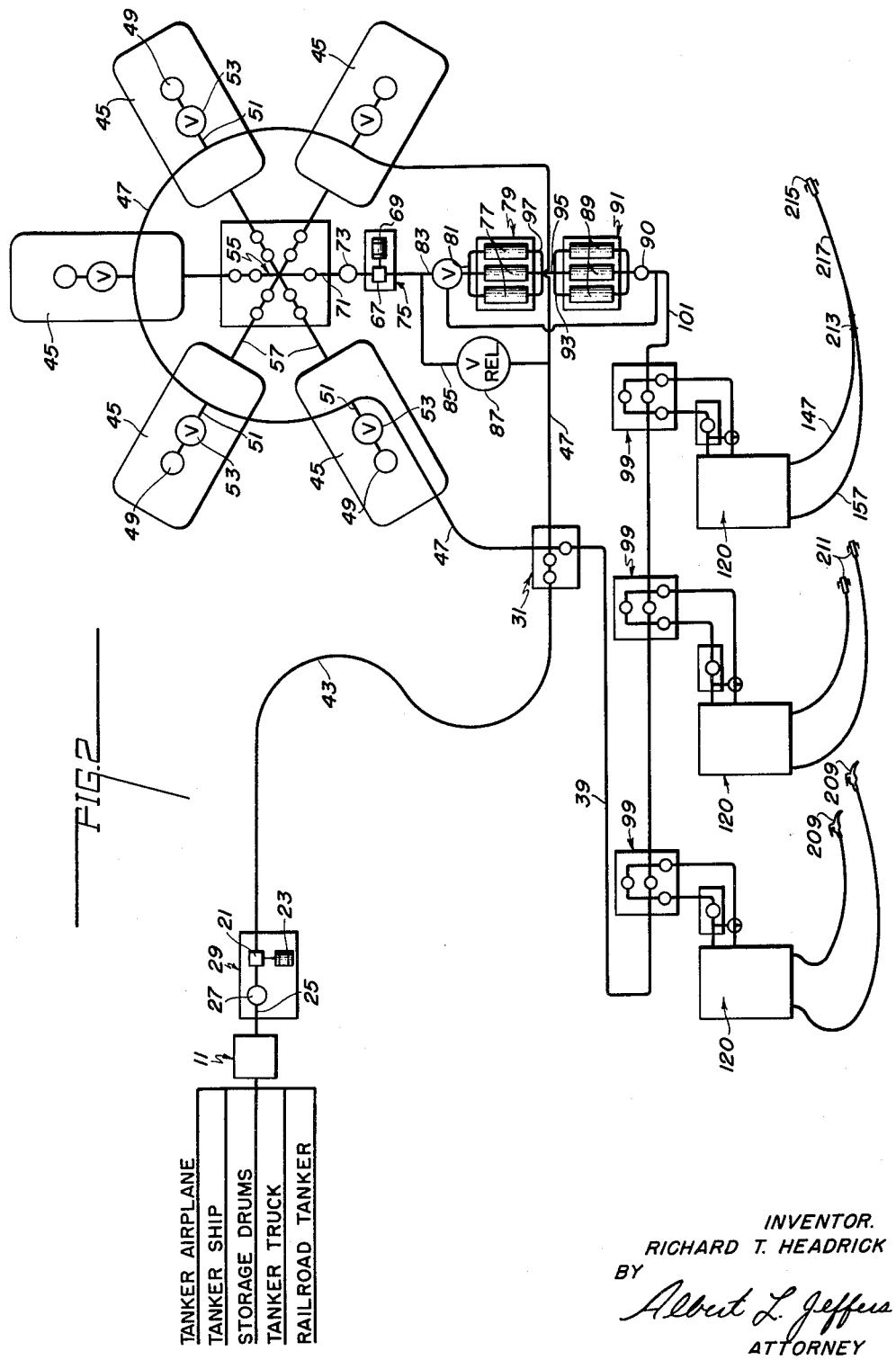
FIGURE 2 is a schematic view of the novel fueling system showing the carts, piping, pumps, valves, meters, etc.
Figure 4:
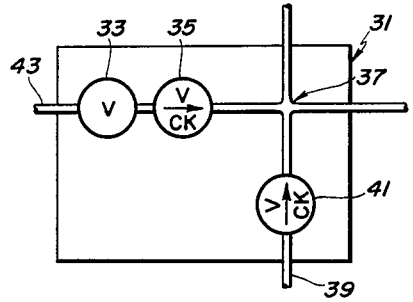
FIGURE 4 is a schematic view of the portable junction cart showing the piping and valves.
Figure 5:
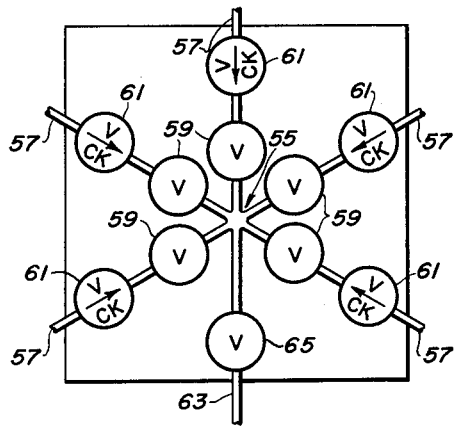
FIGURE 5 is a schematic view of the portable header illustrating the piping and valves.
Figure 3:
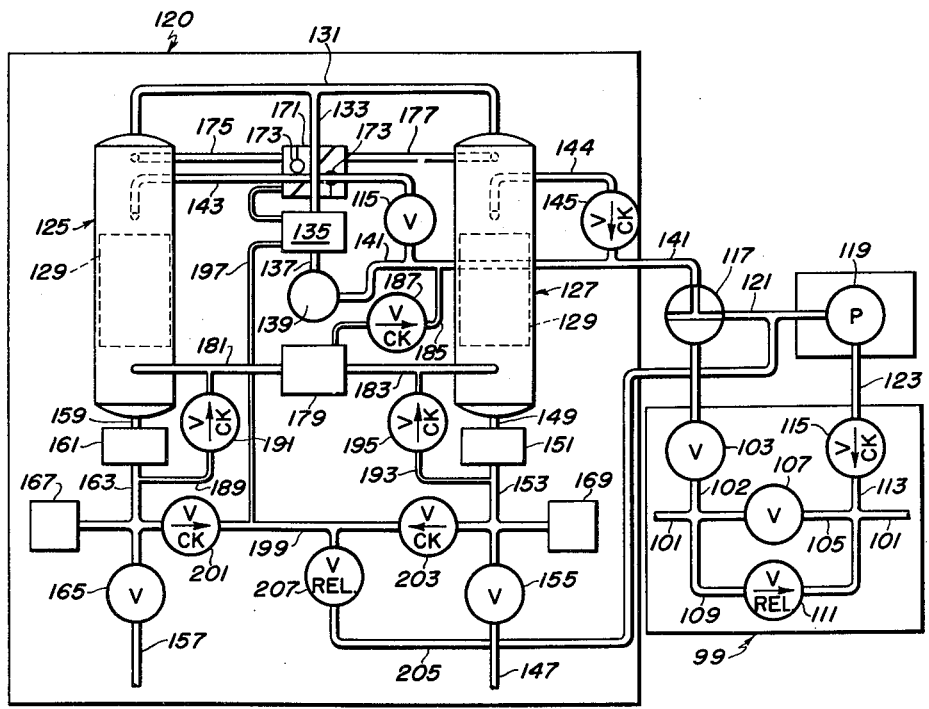
FIGURE 3 is a schematic view of the portable service fueling vehicle and portable delivery stations illustrating the piping, valves, filters and surge suppressors, etc.

Referring to the fueling system exemplified in FIGURES 1 and 2 of the drawing, the numeral 11 generally designates an adapter kit which may be connected to a variety of fuel supply sources such as storage drums 13, railroad tanker 15, truck tanker 17, or KC–97 or similar aircraft tanker 19. The fuel supply source may be a ship tanker off shore which may supply fuel through a floating hose or amphibious vehicles carryin collapsible pillow tanks.

The supply pump 21 is driven by an engine 23. The pump is connected to the adapter kit through line 25 provided with a line strainer 27. The pump 21, engine 23 and strainer 27 are mounted on a skid wheel cart 29 which may be positioned in close proximity to the source of supply.

The junction skid wheel cart designated 31 is provided with an inlet gate valve 33, a check valve 35 and a cross fitting 37 which is connected to the perimeter supply line 47 to permit circulation of the fuel in both directions. The recirculating or return line 39 is provided with a check valve 41, and is connected to the cross fitting. The gate valve 33 is connected to the discharge of the pump 21 by a flexible discharge line 43.

A number of collapsible pillow tanks designated 45 are spaced substantially in a circle with their outlet side disposed toward the center of the circle. It should be noted that the tanks are not susceptible to explosion hazard due to the fact that there is no void space regardless of the degree to which they are filled. A flexible perimeter line 47 is connected to the cross fitting and extends around the perimeter of the collapsible tanks 45. Each pillow tank is provided with a fuel inlet and pilot valve 49 adapted to open at 5 inches of water pressure and close at 8 inches of water pressure, which will permit the tanks to be fueled to their capacity without danger of inflation or tank rupturing. The branch lines 51 provided with gate valves 53 connect the inlet valves 49 with the supply line 47.

The six-way header designated 55 is mounted on a skid wheel vehicle and is positioned in the geometric center of the tank farm layout. The header inlets 57 are provided with a gate valve 59 for selectivity and a check valve 61 to permit reverse flow in the event one tank is disposed on higher ground. The header outlet 63 is provided with a gate valve 65.

A transfer pump 67 is driven by a gas turbine engine 69. A flexible line 71 having a line strainer 73 connects the pump suction with the header outlet 63. The pump 67, engine 69 and strainer 73 are mounted on a skid wheel cart 75 for portability.

A number of filter/water separators 77 for removing contaminant and water from the fuel are mounted on the skid wheel cart 79 and are connected to the pump discharge through a header 81 and a flexible line 83. A high pressure bypass line 85 provided with a high pressure relief valve 87 which is mounted on the cart 75 is connected to the line 83 and to the perimeter supply line 47 thereby preventing pump overheating or cavitation when all outlets are closed in the delivery system.

A number of aluminum type desiccant dehydrators 89 are mounted on a skid wheel cart 91 and are connected to the filter/water separators through a header 93, flexible line 95 and header 97. It should be noted that the desiccant dehydrators are used only with jet fuels and only where water in chemical solution is required to be removed. It is not generally accepted practice to use desiccant dehydrators with aviation gasolines because of its tendency to remove the additives in the gasoline.

The flight line lateral junction skid wheel carts designated 99 are connected by a supply line 101. A delivery line 102 provided with a gate valve 103 is connected to the line 101. A number of gate valves 107 are interposed in the supply line 101. A high pressure bypass relief line 109 provided with a high pressure relief valve 111 provides a bypass around each valve 107. A defuel line 113 having a check valve 115 is connected to the supply line 101.

The fuel servicing vehicle 120 may be designed and constructed in various ways, but as herein disclosed it is provided with a three-way valve 117 adapted to be connected to the delivery line 102. An auxiliary pump 119, is provided with an inlet line 121 connected to the three-way valve 117 and having its discharge line 123 connected to the defuel or return line 113. The vehicle supports the tanks 125 and 127 which are provided with a filter/water separator unit 129 disposed in each tank for removing any contaminant or water in the fuel. The inlets of the tanks are connected to the three-way valve through a header 131, line 133, pressure regulator 135, line 137, line strainer 139 and line 141. The branch defuel lines 143 and 144 having check valves 145 are connected to the bottom portion of the tanks 125 and 127, respectively, and to the line 141. The outlet of tank 127 is connected to the fueling hose 147 through line 149, meter, 151, line 153 and control valve 155. The outlet of tank 125 is connected to the fueling hose 157, through line 159, meter 161, line 163 and valve 165. A pair of surge arrestors 167 and 169 are disposed between the valves 165 and 155, and the meters 161 and 151. A divided fuel water sump 171 having identical dump valve assemblies 173 is connected to the bottom portion of the tanks 125 and 127 through lines 175 and 177 respectively. An air eliminator 179 is connected to the upper portion of the tanks 125 and 127 through lines 181 and 183 respectively. A line 185 provided with a check valve 187 connects the air eliminator with the inlet line 141. The line 163 is vented to line 181 through line 189 provided with a check valve 191. The line 153 is vented to line 183 through line 193 provided with a check valve 195. The pressure regulator 135 is connected to the lines 153 and 163 through line 197 and line 199 provided with check valves 201 and 203 respectively.

A high pressure bypass line 205 provided with a relief valve 207 connects the line 199 with the line 121.

Operation

Assuming that all of the component erector parts have been transported to the fueling site and assembled, the collapsible pillow tanks 45 may be filled to their capacity with fuel through the adapter kit or connector 11 which is connected to the source of supply through the strainer 27, pump 21, flexible supply line 43, junction skid cart 31 having a control gate valve 33, perimeter supply line 47, branch lines 51, gate valves 53, and inlet valves 49.

The control header 55 joins the outlets of the collapsible pillow tanks to the pump 67 which supplies the fuel to the flight line at junction carts 99 through the filter/water separator 77, rate of flow control valve 90, and line 101.

The fuel flows from the lateral junction cart 99 to the three-way valve 117 on the fuel servicing vehicle 120 through the line 102 and valve 103.

The fuel then flows through a line strainer 139, a pressure regulator 135, Siamese manifold 131 and into the tanks 125 and 127. In each tank the fuel passes through a filter/water separator 129 which removes the contaminant and water therein and passing the clean fuel to the outlet hoses 147, 157 through meters 151 and 161, and valves 155 and 165 respectively. The surge arrestors 167 and 169 function to prevent damage to the meters when the nozzles are closed during the dispensing operation. The air eliminator 179 serves as a vacuum breaker from the downstream side of the meter to prevent the metering of air during defueling operation and to allow the meter rotors to remain submerged.

As shown in FIGURES 1 and 2, the fuel may be delivered to the aircraft in a number of different ways in that a hand held over wing nozzle 209, or, center point nozzles 211 may be connected to the lines 157 and 147 respectively.

The lines 147 and 157 may be joined by a Siamese coupling 213 which in turn is connected to a center point pressure nozzle 215 by a hose line 217.

Recirculation of the fuel through the storage tanks may be accomplished before fueling the first aircraft by closing the valves 103 thereby permitting the fuel to pass through the flushing or return line 39 to the perimeter supply line 147. The fuel service vehicle 120, including the lines 147 and 157, may be defueled by turning the three-way valve to close off the inlet flow and opening a port to the line 121 whereby the auxiliary pump 119 will bleed off all the fuel and discharge it into the return line 39.

Attention is directed to the fact that the fueling system is such that it may be varied readily to meet the requirements of specific commands. For example, some conditions will require a smaller tank farm and possibly only one fuel servicing vehicle. The applications and requirements vary so widely that the fueling system should not be limited to any specific set of requirements, but should incorporate the novel features which make the fueling system applicable to all known requirements.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. An air transportable hydrant refueling system comprising, in combination, a portable collapsible storage tank, supply means including a connector adapter kit for transferring fuel from a carrier to said portable collapsible storage tank, portable delivery means including a filter/coalescer for coalescing emulsions of fuel and water whereby the water is formed into water droplets and adapted to separate the water droplets from the fuel, said filter/coalescer communicating with said storage tank for transferring fuel to a portable fueling junction station, and portable means including a filter/coalescer communicating with the fueling station for delivery of fuel at the flight line.

2. An air transportable hydrant refueling system comprising an adapter connector means for connection to a source of fuel supply, first transfer portable means including a pump drawing fuel from the fuel supply and discharging the fuel to a portable collapsible storage tank, second transfer portable means including a pump drawing fuel from said storage tank and discharging the fuel to a portable dispensing means at the flight line, said dispensing means including a filter/coalescer for coalescing emulsions of fuel and water whereby the water is formed into water droplets and adapted to separate the water droplets from the fuel and for removing contaminant from the fuel.

3. In an air transportable hydrant refueling system of the erector type comprising, in combination, portable means including a first pump for transferring fuel from a carrier to a portable collapsible storage tank, a portable header provided with control valves to permit circulation of the fuel in both directions, portable delivery means including a second pump for transferring fuel from said storage tank to a fueling nozzle, said delivery means including a filter/coalescer for coalescing emulsions of fuel and water whereby the water is formed into water droplets and adapted to separate the water droplets from the fuel.

4. In an air transportable hydrant refueling system of an erector type comprising in combination with a source of fuel, portable adapter connector means for connecting a flexible line to the source of fuel, portable supply means including a pump and strainer for transferring fuel to a number of portable collapsible storage tanks, said supply means provided with a portable junction cart having control valves to permit circulation of the fuel in both directions, fuel moving means including a portable header connected to said storage tank for supplying fuel to a fueling nozzle, said fuel moving means provided with a portable filter/coalescer for coalescing emulsions of fuel and water whereby the water is formed into water droplets and adapted to separate the water droplets from the fuel.

5. In an air transportable hydrant refueling system of an erector type comprising in combination with a source of fuel, supply means for transferring fuel from the source to a number of portable collapsible storage tanks, portable fuel moving means connected to said collapsible tanks for transferring fuel to a nozzle, said fuel moving means provided with a portable filter/coalescer for coalescing emulsions of fuel and water whereby the water is formed into water droplets and adapted to separate the water droplets from the fuel, and a desiccant dehydrator connected in series with the filter/coalescer for removing contaminant and water from the fuel.

6. In an air transportable hydrant refueling system of an erector type comprising in combination with a source of fuel, portable supply means for transferring fuel from the source of fuel to a number of portable collapsible storage tanks, a portable header provided with control valves to permit circulation of the fuel in both directions, a portable pump having an inlet connected to said header and an outlet connected to a fueling nozzle, a bypass line provided with a high pressure relief valve having one end connected between the nozzle and pump discharge and the other end connected to the said supply means, portable filter/coalescer means disposed between the pump and nozzle for coalescing emulsions of fuel and water whereby the water is formed into water droplets and adapted to separate the water droplets from the fuel.

7. In an air transportable hydrant refueling system of the erector type comprising, in combination with a source of fuel, portable adapter connector means for connecting a first flexible line to the source of fuel, a first portable pump having its inlet connected to the first line and its discharge connected to a second flexible line, a portable junction cart having a control valve connected to the fuel line, a number of spaced collapsible storage tanks, a flexible supply line connected to the control valve and connected to the inlet of said collapsible tanks, a portable header having flexible lines connected to the outlet of said collapsible tanks, a second portable pump having an inlet connected to said header, a number of portable individual fueling stations spaced on the flight line, a flexible distribution line connected to the second pump discharge and to the individual fueling stations, a first portable filter/coalescer interposed in the distribution line between the pump and stations for removing contaminant and water from the fuel, a bypass line having a high pressure relief valve disposed between the distribution line and supply line, a second portable filter/coalescer for coalescing emulsions of fuel and water whereby the water is formed into water droplets and adapted to separate the water droplets from the fuel communicating with each individual fueling station, and each second filter/coalescer connected to a fueling nozzle.

References Cited in the file of this patent

UNITED STATES PATENTS

| | | |
|---|---|---|
| 1,383,708 | Farr | July 5, 1921 |
| 1,702,866 | Hayes | Feb. 19, 1929 |
| 1,707,657 | Douglas | Apr. 2, 1929 |
| 1,788,987 | Cunningham | Jan. 13, 1931 |
| 2,084,597 | Risser | June 22, 1937 |
| 2,507,597 | Holdridge | May 16, 1950 |
| 2,579,053 | Schulstadt | Dec. 18, 1951 |
| 2,675,943 | Daley et al. | Apr. 20, 1954 |
| 2,682,353 | Bills et al. | June 29, 1954 |
| 2,724,418 | Krupp | Nov. 22, 1955 |
| 2,746,648 | Grossman et al. | May 22, 1956 |